Feb. 23, 1932.    G. C. SINGER    1,846,980
TRANSPLANTING RECEPTACLE
Filed Sept. 30, 1929
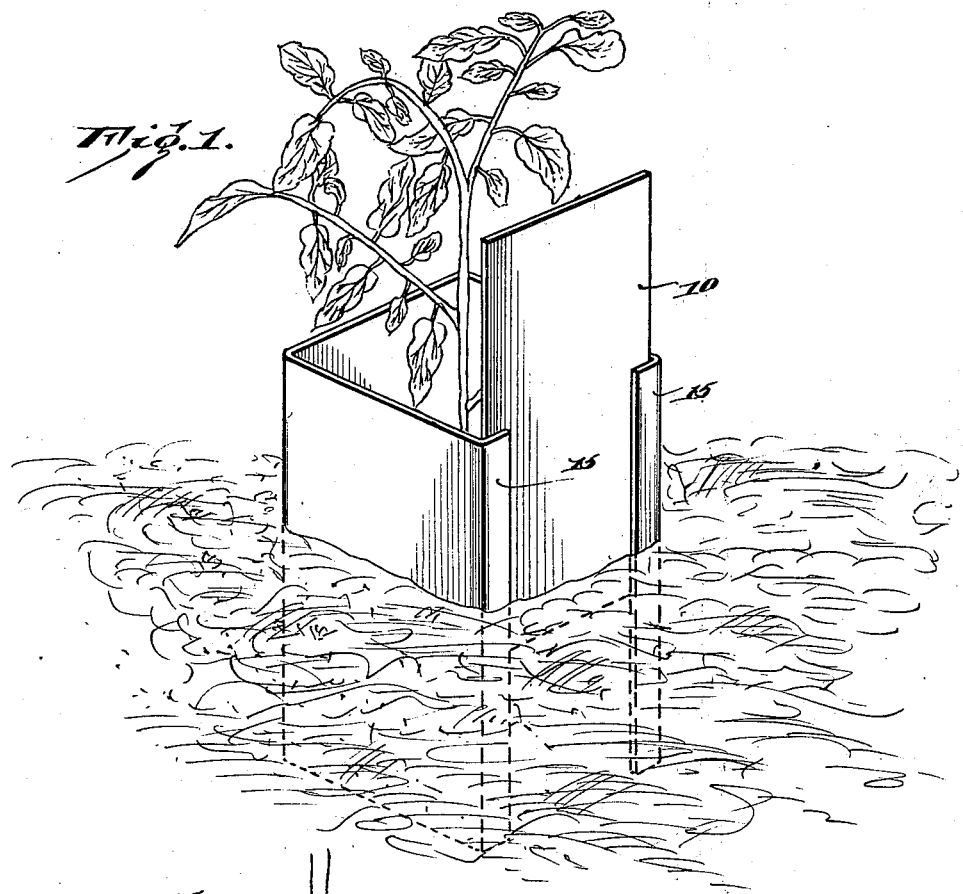
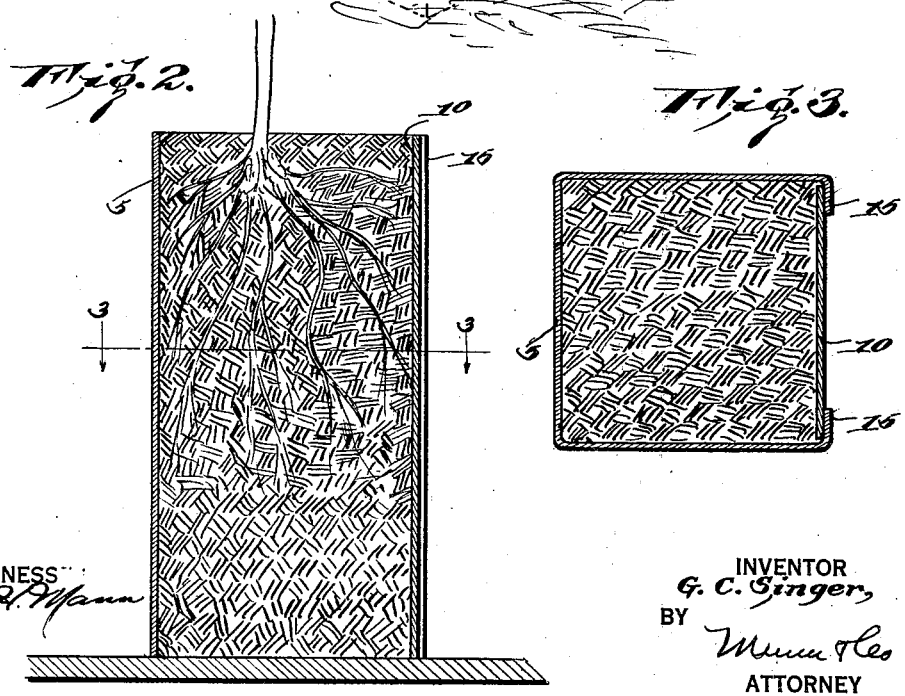

Patented Feb. 23, 1932

1,846,980

UNITED STATES PATENT OFFICE

GROVER C. SINGER, OF MISSION, TEXAS

TRANSPLANTING RECEPTACLE

Application filed September 30, 1929. Serial No. 396,273.

My invention relates to transplanting receptacles for transplanting or setting out small plants.

It is recognized that it is old to provide a tubular transplanting device embodying a pair of mating sections to be inserted into the ground upon opposite sides of the plant to be transplanted. With such a device it will be extremely difficult to properly mate or assemble the sections about the plant due to the fact that the small plants are arranged relatively close together and the foliage from adjacent plants will render the device invisible. Thus the plant being transplanted must be bent from side to side so that the operator may observe below the plant foliage. It is obvious that such manipulation of the plants is undesirable in that they are small and are likely to become broken off or otherwise damaged.

With these objects in mind it is the principal object of the present invention to provide a transplanting receptacle which may be placed about the plant with facility and ease and does not necessitate manipulating or bending of the plant that is being transplanted.

More specifically the invention provides a channel-shaped member for insertion into the ground and having parallel marginal flanges along its side walls and a removable panel insertable into the channel-shaped member along such flanges.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a perspective of my device in operation; the removal panel being partially inserted in the device;

Fig. 2 is a vertically longitudinal sectional view;

Fig. 3 is a horizontal section taken on line 3—3 of Fig. 2.

Referring to the invention in detail a channel-shaped member 5 of a length to penetrate the ground to a depth below the roots of the plant and of such cross sectional area as to leave substantial clearance between the stem of the plant and walls of the U-shaped member, is provided. This U-shaped member is formed from a length of sheet metal of the requisite strength and durability to withstand endwise pressure onto the same when it is forced into the ground. In order to close the open side of the U-shaped member after it has been inserted into the ground around the plant a rectangular sheet metal panel or wall 10 of the same dimensions as the intermediate wall of the U-shaped member is provided. To prevent lateral displacement of this panel in an outward direction from between the ends of the parallel walls of the U-shaped member these parallel walls are formed with inwardly directed marginal flanges 15 which, as disclosed in Fig. 1, overlie the longitudinal edges of the panel 10.

In practice the channel-shaped member is initially lowered to one side of the plant and then shoved laterally to embrace the same. After the channel-shaped member has been properly positioned it is forced into the soil. The panel 10 is then shoved downwardly between the parallel side walls to close the open side of the U-shaped member. With the soil and plant confined within the device it is lifted from the ground. In order to prevent the soil from gravitating from the lower end of the device the operator places one hand beneath the same. In transplanting the plant contained in the device the latter is forced into the ground as above stated. The panel 10 is then removed so that the operator may insert his hands into the open side and press the soil around the roots of the plant.

It will be noted that the panel 10 is laterally as well as longitudinally movable within the channel member 5 so as to permit the varying the size of the receptacle by inserting the panel 10 either at an angle to the rear wall of the channel member 5 or by inserting the panel 10 intermediate of the flanges 15 and said rear wall. As it is always desirable to compact the soil around the roots of a plant to be transplanted, the panel 10 may be fulcrumed about the top edges of the flanges 15 thereby urging the lower edge of the panel against the soil around the roots of the plant and effectually compacting said soil so that it will not be lost during the transplanting operation.

An additional feature of my invention, which is secured by constructing the panel 10 so that it is laterally movable within the channel member 5, is also important when it is found that the plants in the germinating boxes are set closely together, as the panel may then be inserted into the channel member at such a point as to cut out only the amount of soil around the plant which is absolutely necessary.

I claim:

1. In a transplanting receptacle, an open ended three sided channel member adapted for insertion into the ground around a growing plant, inturned flanges formed on the longitudinal free edges of said channel member, said flanges being substantially in the same plane relative to each other and substantially at right angles to the sides of said channel member on which they are formed, and a flat panel adapted for insertion longitudinally within said channel member whereby to close the open side thereof, said panel being held from displacement outwardly by said flanges and being laterally movable within the channel member whereby to vary the cross sectional area of the receptacle thus formed and to permit compacting of soil about the roots of the plant.

2. A transplanting receptacle comprising an open ended three sided channel member having a rear wall and two substantially parallel side walls, inturned flanges formed on the longitudinal free edges of said side walls, said flanges being in substantially the same plane relative to each other, a panel insertible longitudinally within said channel member between said flanges and said rear wall, said panel being laterally movable and tiltable therein, the top edges of said inturned flanges acting as fulcrum points about which said panel may be tilted when the upper end thereof is urged outwardly whereby to cause the lower end to move toward the rear wall of the channel member.

GROVER C. SINGER.